United States Patent [19]

Kumagai et al.

[11] Patent Number: 5,130,511
[45] Date of Patent: Jul. 14, 1992

[54] METHOD OF AND APPARATUS FOR WELDING PANEL WITH SPACE DEFINED THEREIN

[75] Inventors: Kiyoshi Kumagai; Satoshi Kadowaki; Masaki Kawada; Yoshio Akasaka; Minoru Kawada, all of Sayama, Japan

[73] Assignee: Honda Giken Kogyo Kabushiki Kaisha, Tokyo, Japan

[21] Appl. No.: 556,319

[22] Filed: Jul. 23, 1990

[30] Foreign Application Priority Data

Jul. 31, 1989 [JP] Japan .................. 1-198418

[51] Int. Cl.⁵ .............. B23K 11/10; B23K 37/00
[52] U.S. Cl. ................. 219/117.1; 219/86.24
[58] Field of Search ............ 219/117.1, 161, 86.25, 219/91.2, 86.24, 86.9; 29/429, 430, 428; 228/44.3, 49.1, 6.1, 6.2

[56] References Cited

U.S. PATENT DOCUMENTS

| | | | |
|---|---|---|---|
| 4,256,947 | 3/1981 | De Candia | 219/86.24 |
| 4,404,451 | 9/1983 | Niikawa et al. | 219/161 |
| 4,776,085 | 10/1988 | Shiiba | 29/430 |
| 4,811,891 | 3/1989 | Yamaoka et al. | 228/49.1 |
| 4,831,710 | 5/1989 | Katoh et al. | 29/430 |
| 4,855,560 | 8/1989 | Sonoda et al. | 219/86.25 |

FOREIGN PATENT DOCUMENTS

| | | | |
|---|---|---|---|
| 59-39482 | 3/1984 | Japan | 219/117.1 |
| 62-263876 | 11/1987 | Japan | 219/86.24 |
| 64-66076 | 3/1989 | Japan | 219/86.9 |

*Primary Examiner*—Geoffrey S. Evans

[57] ABSTRACT

An automobile side panel with a space defined therein is welded by positioning a plurality of outer panel components with a plurality of first clamping mechanisms, welding the positioned outer panel components into an outer side panel member, positioning an inner side panel member in superposed relation to the outer side panel member with a plurality of second clamping mechanisms, and welding the positioned outer and inner side panel members into a side panel, with the space defined between the outer and inner side panel members. The outer panel components and the outer and inner side panel members are welded in one welding station.

10 Claims, 12 Drawing Sheets

METHOD OF AND APPARATUS FOR WELDING PANEL WITH SPACE DEFINED THEREIN

BACKGROUND OF THE INVENTION

The present invention relates to a method of and an apparatus for welding a pane with a space defined therein, and more particularly to a method of and an apparatus for welding inner and outer members of a side panel of an automobile, for example, with a welding gun while holding the inner and outer members with clamps, by welding the components of the outer members and welding the inner and outer members to each other in one welding station.

Side panels for automobiles are essentially composed of an outer member positioned on the outer side of an automobile body and an inner member positioned on the inner side of the automobile body. The outer and inner members of a side panel are welded together, with an inner space defined therebetween. The outer and inner side panel members are thus spaced from each other with the inner space therebetween because the side panel is required to have a certain thickness for a desired mechanical strength of its own and for supporting a door or the like.

The outer side panel member to be securely welded to the inner side panel member is manufactured in either of the two methods described below. According to the first method, an outer side panel member is produced as a unitary structure from a single pressed sheet material. According to the second method, a plurality of small separate elements or components are welded together into an outer side panel member. The latter process is widely employed in the art to produce outer side panel members since the material can be utilized to a great extent, and molds and presses are simple in structure.

For example, as shown in FIG. 1 of the accompanying drawings, an outer side panel member for a box-type automobile, e.g., a van, is composed of small components a through g. Before the components a through g are welded, they are positioned in abutment and fixed by clamps X. Thereafter, the components a through g are welded together at joints by welding guns Y.

Then, as shown in FIG. 2, small components h through k of an inner side panel member are positioned and fixed in superposing relation to the outer side panel member by clamps Xa, and are welded to the outer side panel member by welding guns Ya.

The small components are welded into the outer side panel member in a first welding station. The inner side panel member is then welded to the welded outer side panel member in a second welding station.

After the inner and outer side panel members are welded to each other an inner space is defined therebetween. If the outer side panel member were to be welded subsequently, a welding gun would not easily be brought into the inner space between the inner and outer side panel members. Therefore, it is necessary to weld the small components in advance to make up the outer side panel member.

The need for the two welding stations before a complete side panel is produced cannot be met if only a small factory space is available. Since workpieces have to be transferred from the first welding station to the second welding station, a suitable feed mechanism is necessary for such workpiece transfer. The first and second welding stations are required to have workpiece positioning clamps for positioning the side panel member components while they are being welded in the welding processes at the welding stations. As a result, the welding equipment in each of the welding stations is large in size and composed of many parts. The workpieces in the second welding station must be positioned with considerable accuracy because the workpieces tend to be displaced in position while they are being fed from the first welding station to the second welding station.

SUMMARY OF THE INVENTION

It is a general object of the present invention to provide a method of and an apparatus for welding a panel in a simplified process and with an increased efficiency.

Another object of the present invention is to provide a method of and an apparatus for welding components of a first member and also welding a second member to the first member, in one welding station, so that the first and second members can be welded accurately in a short period of time.

Still another object of the present invention is to provide a method of and an apparatus for welding components while holding them with clamps in first and second welding processes, with some of the clamps being shared by the first and second welding processes, reducing the parts used in the first and second welding processes, and also with the first and second welding processes being effected in a single space.

Another object of the present invention is to provide a method of welding a panel with a space defined therein, comprising the steps of a) positioning a plurality of first panel components with a plurality of first clamping mechanisms, b) welding the positioned first panel components into a first panel member in a welding station, c) positioning a second panel member in superposed relation to the first panel member with a plurality of second clamping mechanisms, and d) welding the positioned first and second panel members into a panel in the welding station.

Still another object of the present invention is to provide the method wherein the positioning step c) comprises the steps of opening selected one of the first clamping mechanisms with the first panel member remaining positioned by the other first clamping mechanisms, and then positioning the first and second panel member in superposed relation with the other first clamping mechanisms and the second clamping mechanisms.

Yet another object of the present invention is to provide the method wherein the positioning step c) comprises the steps of successively operating the first clamping mechanisms to release the first panel member, and then bringing the second panel member into superposed relation to the first panel member with respect to the successively released first camping mechanisms.

Yet still another object of the present invention is to provide the method wherein the first panel member comprises an automobile outer side panel member and the second panel member comprises an automobile inner side panel member.

It is also an object of the present invention to provide an apparatus for welding a panel with a space defined therein, comprising a plurality of first clamping mechanisms for positioning a plurality of first panel components, a plurality of first welding guns for welding the positioned first panel components into a first panel member, a plurality of second clamping mechanisms for positioning a second panel member in superposed relation to the first panel member, and a plurality of second welding guns for welding the positioned first and second panel members, the first clamping mechanisms, the second clamping mechanisms, the first welding guns, and the second welding guns being disposed in one welding station.

A further object of the present invention is to provide the apparatus wherein each of the first clamping mechanisms comprises a fixed clamp and a first movable clamp for receiving the first panel member and a second movable clamp for pressing the first panel member.

A still further object of the present invention is to provide the apparatus wherein each of the second clamping mechanism is positioned for coaction with one of the fixed and first movable clamps, the each second clamping mechanism comprising a movable clamp for positioning the second panel member in coaction with the one of the fixed and first movable clamps while the second second movable clamp is being retracted away from the fixed and first movable clamps.

A yet further object of the present invention is to provide the apparatus wherein the second movable clamp of each of the first clamping mechanisms comprises a pair of pressers and an intermediate presser positioned therebetween, and the movable camp of the each second clamping mechanism is essentially identical in shape to the second movable clamp except that the movable clamp is devoid of the intermediate presser.

A yet still further object of the present invention is to provide the apparatus wherein each of the second clamping mechanisms has a guide member for positioning an end of the first panel member.

Another object of the present invention is to provide the apparatus wherein a space is defined between the first and second panel members which are welded to each other.

Still another object of the present invention is to provide the apparatus wherein the first panel member comprises an automobile outer side panel member and the second panel member comprises an automobile inner side panel member.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
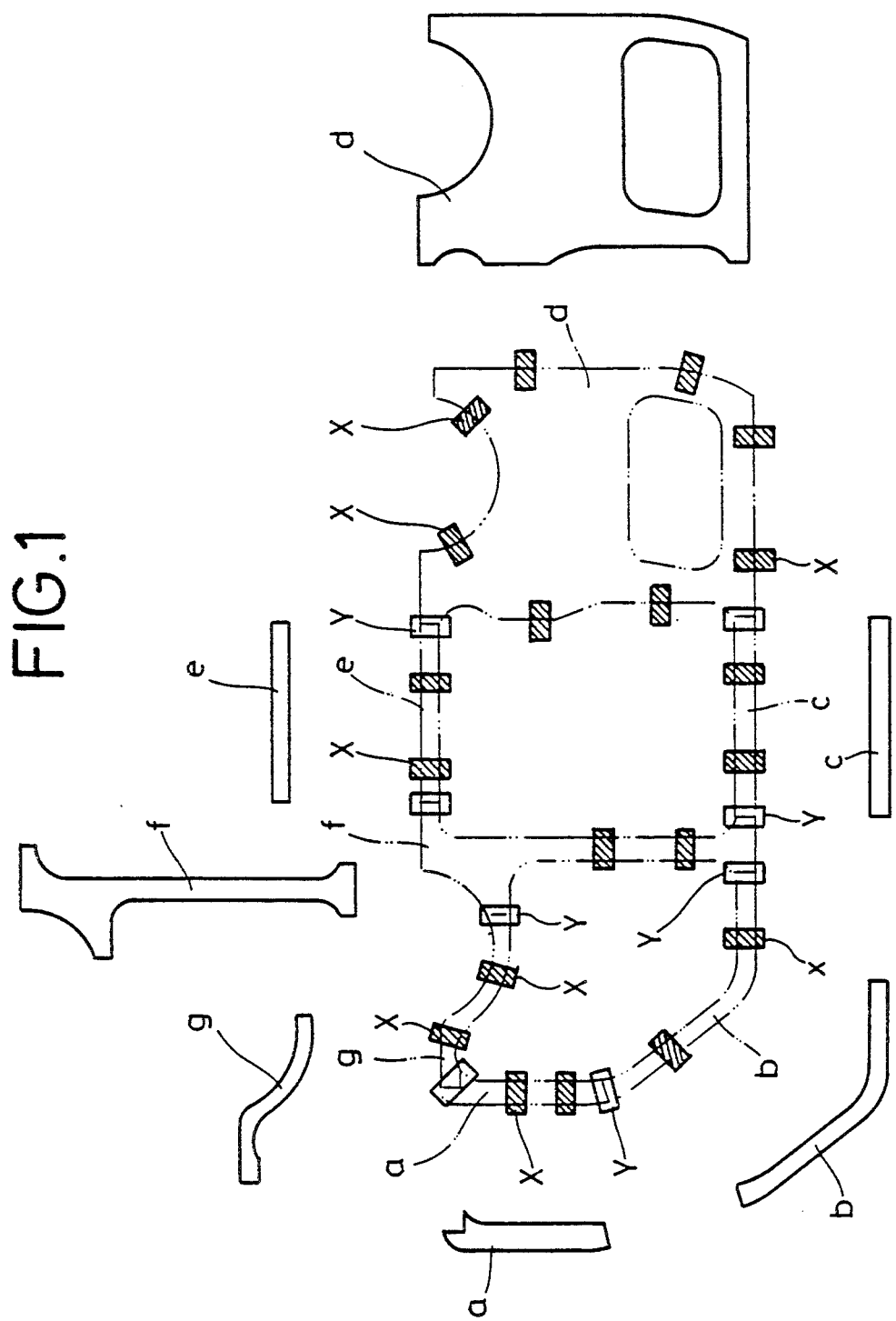
FIG. 1 is a schematic front elevational view showing small components which make up an outer side panel member, clamps, and welding guns.
Figure 2:
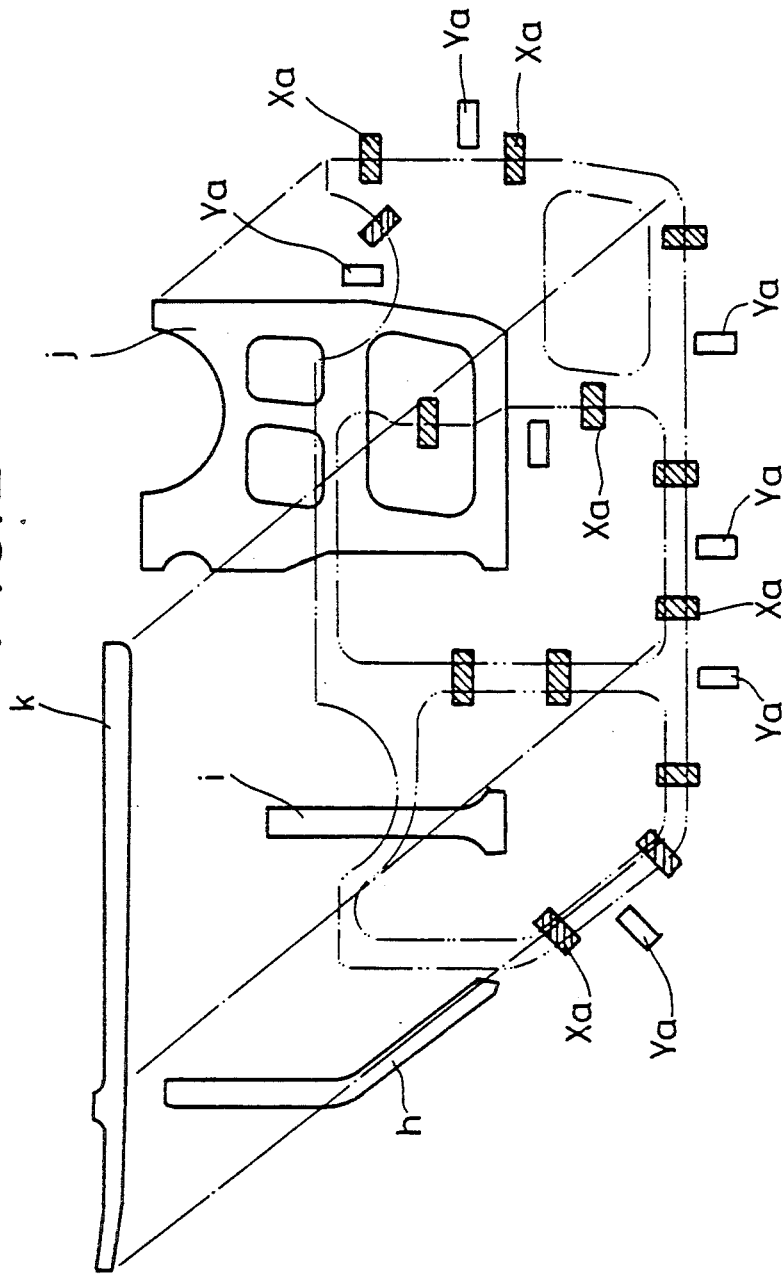
FIG. 2 is a schematic front elevational view showing the manner in which small components which make up an inner side panel/member are positioned and welded to the completed outer side panel member.
Figure 3:
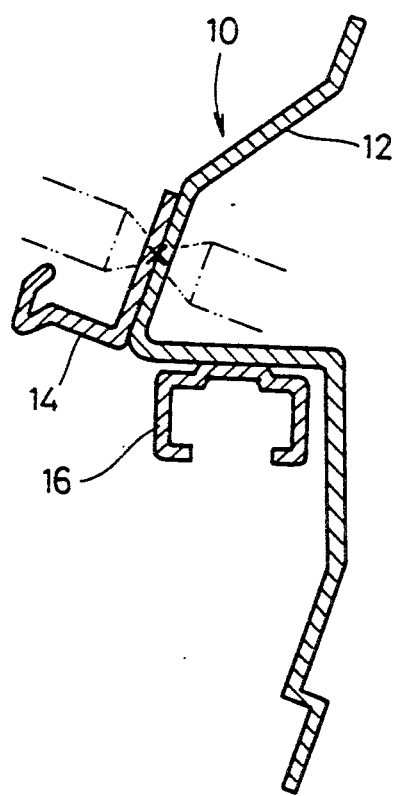
FIG. 3 is a vertical cross-sectional view of an outer side panel member.

FIG. 3 shows an outer side panel member 10 to be welded according to the present invention. The outer side panel member 10 essentially comprises a panel component 12 and a drip molding 14 as another panel component. When the panel component 12 is delivered to a welding station, a rail 16 for guiding a sliding automobile door has already been welded to the panel component 12. The drip molding 14 is welded to the panel component 12 at a position indicated by x. More specifically, the pane component 12 and the drip molding 14 are gripped by a welding gun as indicated by the two-dot-and-dash lines, and welded to each other by the Joule heat generated by a welding current passing from the welding gun through the panel component 12 and the drip molding 14.

Figure 4:
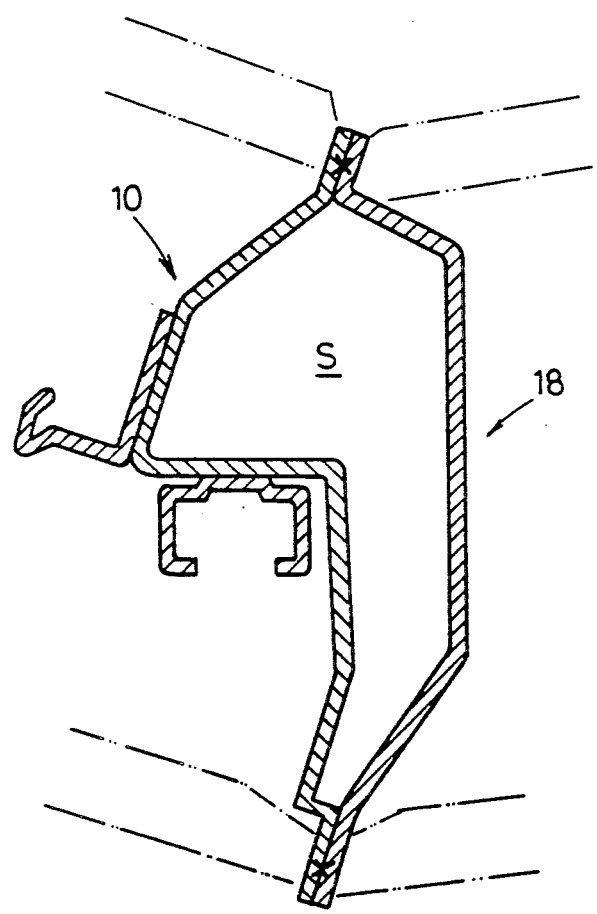
FIG. 4 is a vertical cross-sectional view showing the manner in which an inner side panel member is welded to the outer side panel member.

FIG. 4 shows an inner side panel member 18 which is welded to the outer side panel member 10 shown in FIG. 3.

As shown in FIG. 4, a space S is defined between the outer side panel member 10 and the inner side panel member 18 which are welded together. If the inner side panel component 18 were first welded to the panel component 12 of the outer side penal member 10, then a welding gun for welding the drip mold 14 could not enter the space S. Therefore, the drip mold 14 is welded to the pane component 12 before the outer and inner side panel members 10, 18 are welded. The outer and inner side panel members 10, 18 are welded at positions indicated by The outer and inner side panel members 10, 18 are superposed on each other and pressed against each other by welding electrodes, as indicated by the two-dot-and-dash lines, which then supply welding currents.

Figure 5:
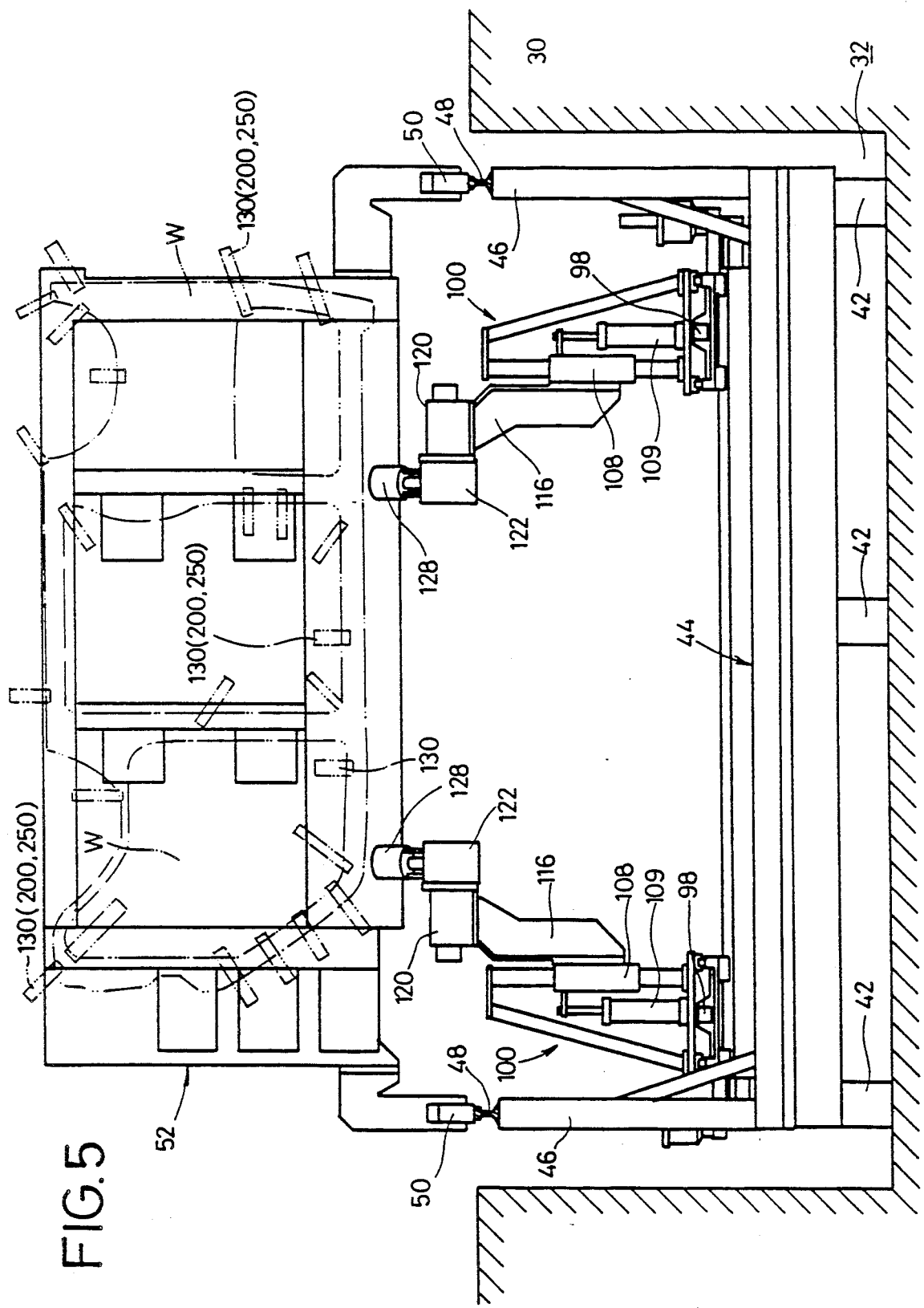
FIG. 5 is a front elevational view of a welding apparatus according to the present invention.

A welding apparatus for welding the outer and inner side panel members 10, 18 together is shown in FIG. 5.

The welding apparatus, generally designated by the reference numeral 40, is placed in a pit 32 defined in a floor 30. The welding apparatus 32 is erected upwardly from within the pit 32.

The welding apparatus 40 has a base 44 supported on a plurality of legs 42 on the bottom of the pit 32, and a plurality of support posts 46 vertically mounted on the ends of the base 44. Rails 48 are mounted on the upper ends of the support posts 46. A support frame 52 is movably supported on the rails 48 by rollers 50. For jig replacement or other servicing, the support frame 52 is displaced along the rails 48 by the rollers 50 and stopped in a certain position where jigs may be replaced or serviced.

Figure 6:
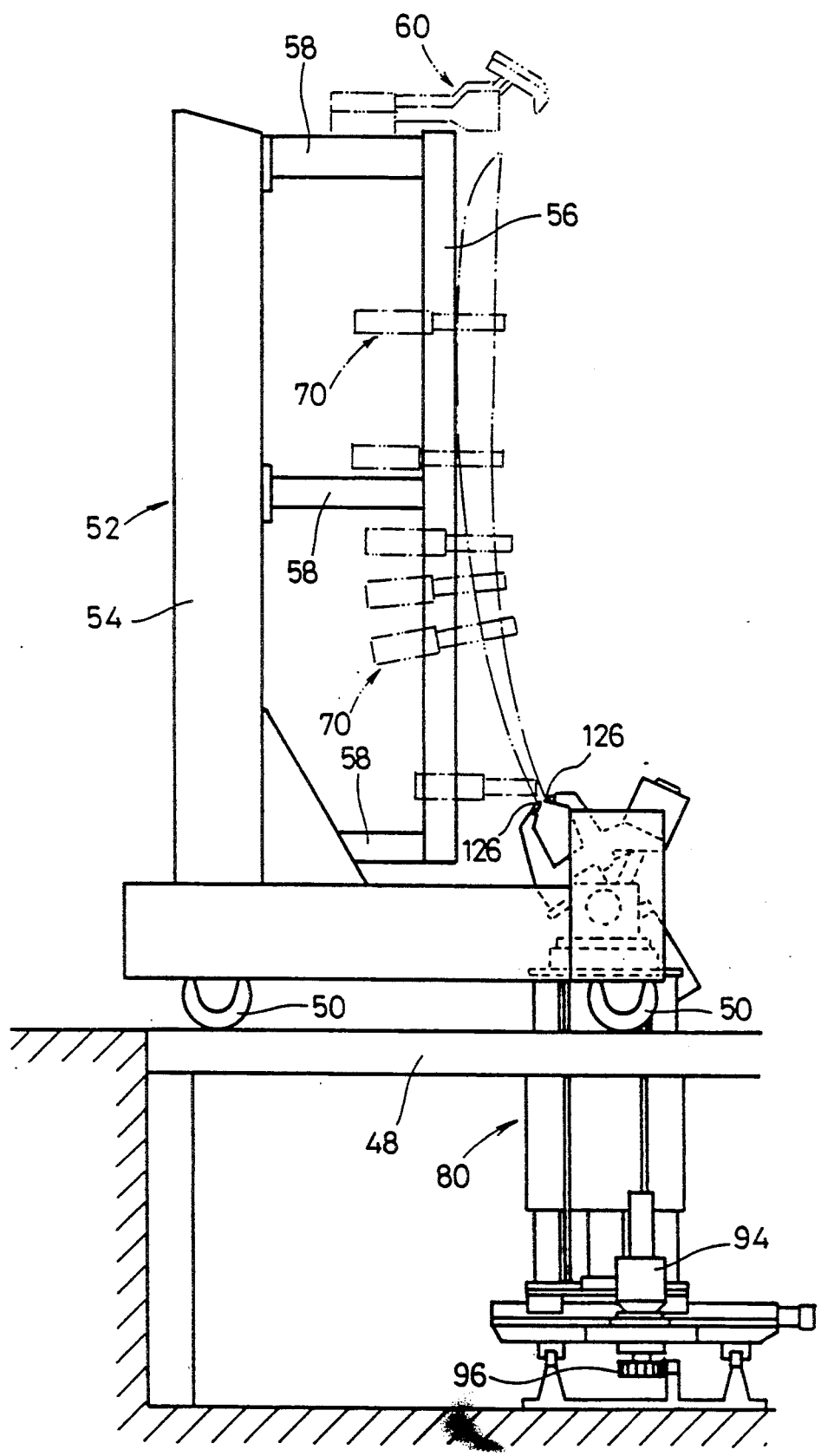
FIG. 6 is a side elevational view of the welding apparatus shown in FIG. 5.

As better shown in FIG. 6, the support frame 52 comprises a vertical support post 54, a support post 56 extending parallel to the support post 54, and horizontal beams 58 connected to and extending between the support posts 54, 56. A welding gun 60 is fixedly mounted on the uppermost horizontal beam 58. The welding gun 60 is of a known construction and hence will not be described in detail below.

Clamping assemblies 70 according to the present invention are vertically, horizontally, and obliquely mounted on the support frame 52, as shown in FIG. 5.

Figure 7:
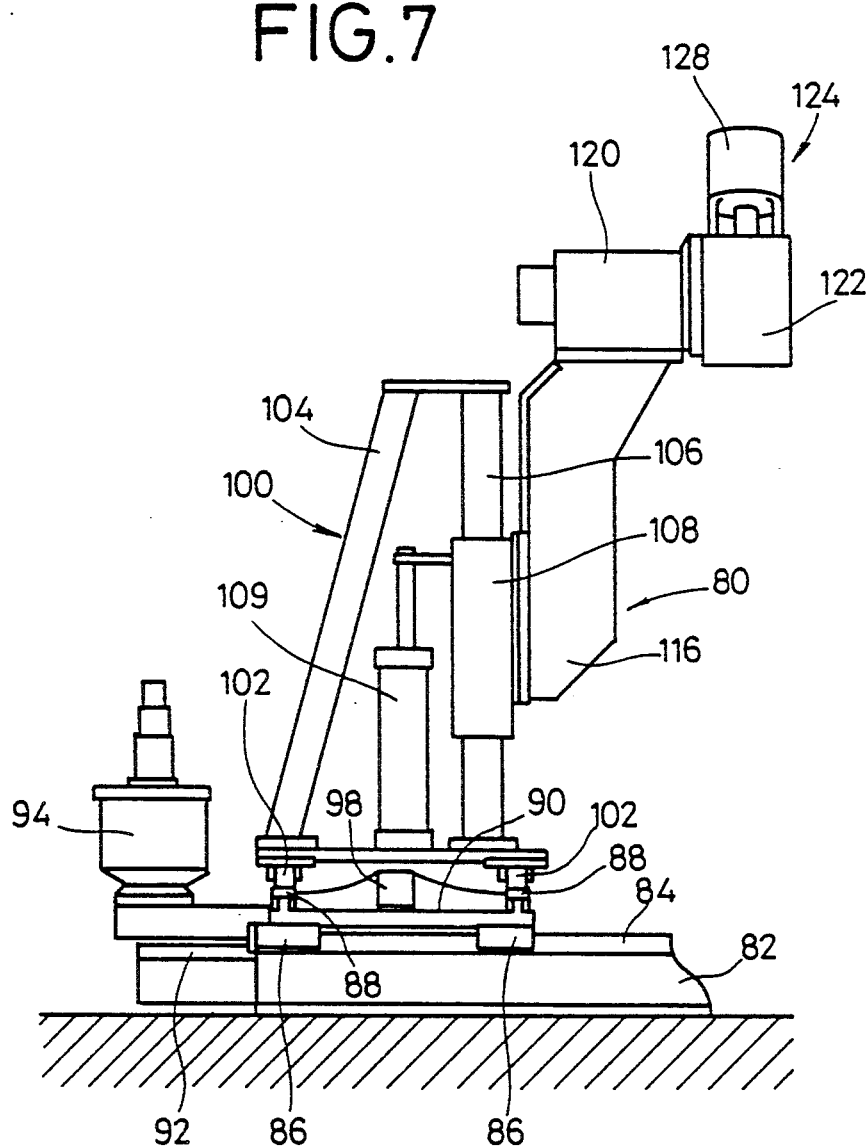
FIG. 7 is a front elevational view of a welding robot incorporated in the welding apparatus shown in FIGS. 5 and 6.
Figure 8:
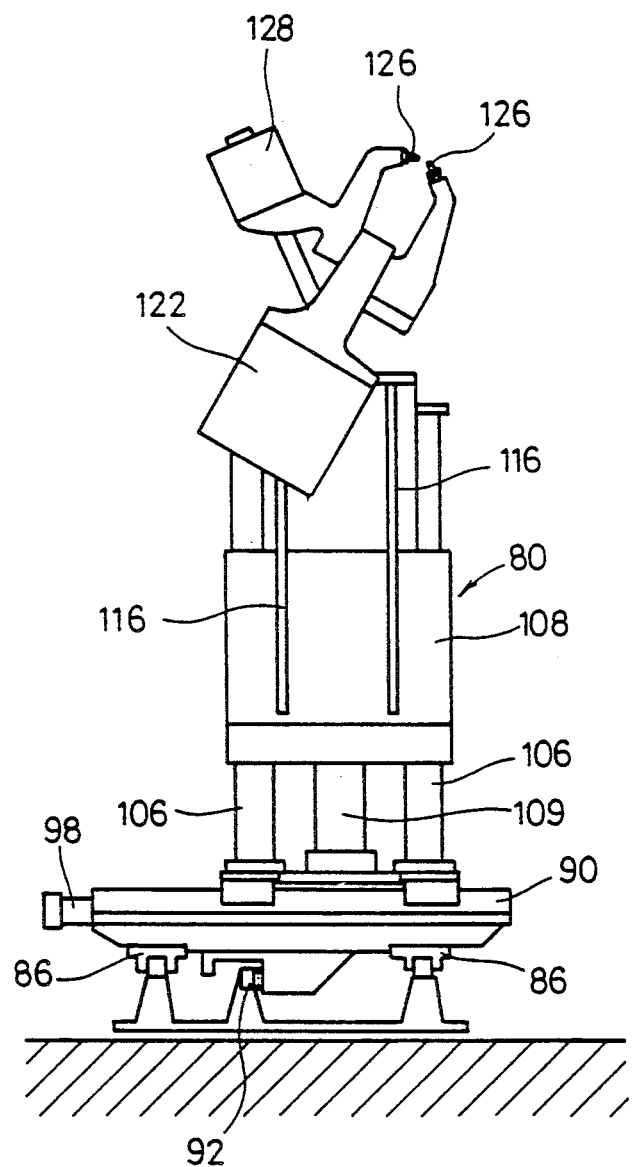
FIG. 8 is a side elevational view of the welding robot illustrated in FIG. 7.

As shown in FIGS. 5 through 7, a pair of welding robots 80 is movably mounted on the base 44 of the welding apparatus 40. Each of the welding robots 80 includes a first support 82 (FIG. 7) with a pair of rails 84 fixed to an upper surface thereof. The rails 84 are engaged by respective guides 86 which support a second support 90 having a pair of rails 88 thereon, the rails 88 extending perpendicularly to the rails 84. A rack 92 is mounted on the first support 82 parallel to the rails 84. The rack 92 is held in mesh with a pinion 96 coupled to the shaft of a hydraulic motor 94 which serves to propel the welding robot 80. A hydraulic cylinder 98 is fixed to one side of the second support 90 and has a piston rod extending parallel to the rails 88, or perpendicularly to the rack 92, the piston rod being coupled to a third support 100.

The third support 100 is movably mounted o the rails 88 by bearings 102 which are placed on the respective rails 88. The third support 100 has a support frame 104 on one end and a pair of vertical guide posts 106 on the opposite end, the support frame 104 and the guide posts 106 being joined to each other at their upper ends. A guide member 108 is vertically slidably supported on the guide posts 106, and can be vertically moved by a cylinder 109.

A pair of vertically extending brackets 116 is installed on an outer side of the guide member 108. The bracket 116 has a horizontal upper surface on which there is fixedly mounted a rotary actuator 120 for turning the tip end of a welding gun 124. The welding gun 124 has a transformer 122 for supplying a welding current to a pair of electrode tips 126, which can be brought toward and away from each other by an air cylinder 128.

The welding gun 124 is well known in the art, and will not be described in detail below. The welding gun 60 shown in FIG. 6 also has transformer which is spaced from the support frame 52.

The clamping assemblies 70 will hereinafter be described in detail. Since the clamping assemblies 70 are essentially identical in construction to each other, only one of the clamping assemblies 70 will be described below.

Figure 9:
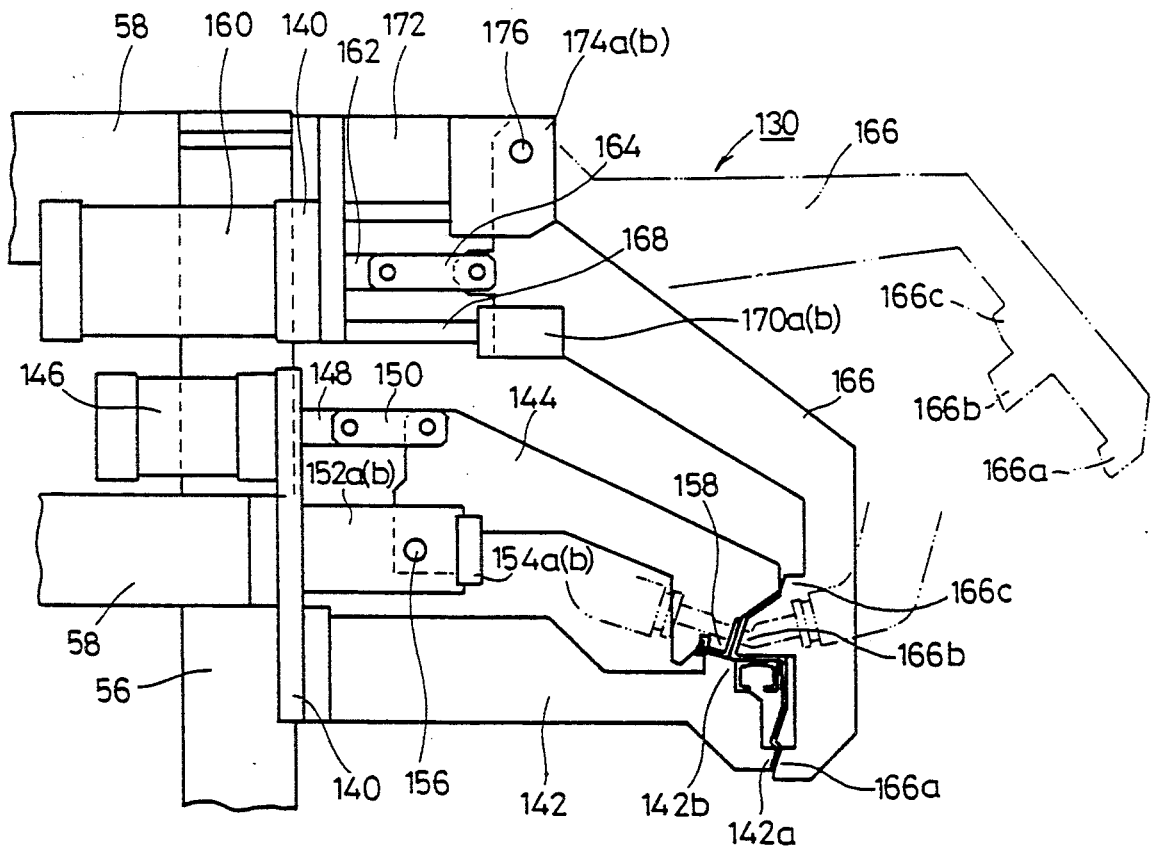
FIG. 9 is a side elevational view of a clamping mechanism for holding a component of the outer side panel member.

The drip molding 14 (FIG. 3) is welded to the panel component 12 of the outer side panel member 10 while the pane component 12 is being fixed by one of the clamping mechanisms 70, which is shown in detail in FIG. 9. The clamping assembly 70 includes a clamping mechanism 130, which has a bracket 140 fixed to the support post 56 and one of the beams 58. The clamping mechanism 130 has a fixed clamp 142 extending horizontally from the bracket 140. The fixed clamp 142 has on its distal end a presser 142a complementary in shape to an end of the panel component 12 and a presser 142b complementary in shape to a side of the rail 16 and a side of the drip molding 14.

The clamping mechanism 130 also has a movable camp 144 angularly movably connected to the bracket 140 in a position disposed upwardly of the fixed clamp 142. A cylinder 146 is fixed to the bracket 140 and has a piston rod 148 coupled through a link 150 to one end of the movable clamp 144. Between the fixed clamp 142 and the piston rod 148, two laterally spaced support arms 152a, 152b are fixed to the bracket 140, and two transverse positioning members 154a, 154b are attached to the distal ends of the support arms 152a, 152b, respectively. The transverse positioning members 154a, 154b are spaced from each other by a distance which is substantially the same as the thickness of the movable clamp 144. The movable clamp 14 is pivotally supported at its proximal end on a shaft 156 which extends between and is coupled to the support arms 152a, 152b.

The movable clamp 144 has on its distal end a presser 158 which is complementary in shape to the other end of the panel component 12 and which can also be inserted into the drip molding 14. The clamping mechanism 130 further includes a movable clamp 166 positioned near and above the movable clamp 144. More specifically, a cylinder 160 is mounted on the support post 56 and has a piston rod 162 which is coupled to one end of the movable clamp 166 through a link 164. A support 168 is fixed to the cylinder 160 and supports two transverse positioning members 170a, 170b on its distal end which are laterally spaced from each other by a distance that is substantially the same as the thickness of the movable clamp 166. The movable clamp 166 is angularly movably supported at its proximal end on a shaft 176 which is coupled to and extends between two laterally spaced support arms 174a, 174b. The support arms 174a, 174b are attached to a support 174 which is mounted on the support post 56 above the piston rod 162 of the cylinder 160.

The movable clamp 166 has on its distal end a presser 166a complementary in shape to the end of the panel component 12 and hence the presser 142a of the fixed clamp 142. The movable clamp 166 also has pressers 166b, 166c complementary in shape to the presser 158 of the movable clamp 144. The clamping mechanism 130 is basically used to clamp the outer side panel member 10. Therefore, the configurations of the pressers 166a, 166b, 166c are selected without concern over the shape of the inner side pane member 18.

The clamping assembly 70 also includes a clamping mechanism 200 for clamping the inner side panel member 18 when it is welded. The clamping mechanism 200 will be described below with reference to FIG. 10.

The clamping mechanism 200 is mounted on the support post 56. The clamping mechanism 200 includes a cylinder 202 fixed to the support post 56 and having a piston rod 204 which is coupled through a link 206 to a finger 210 of a movable clamp 208. A support 224 is fixed to a bracket 222 which is fixed to the cylinder 202, and two transversely spaced support arms 226a, 226b are attached to the distal end of the support 224. The movable clamp 208 is angularly movably supported at its proximal end on a shaft 228 which is coupled to and extends between the support arms 226a, 226b. The movable clamp 208 has on its distal end a presser 208a shaped complementarily to one end of the inner side panel member 18 and hence to the presser 158 of the movable clamp 144 and another presser 208b shaped complementarily to the other end of the inner side panel member 18 and hence to the presser 142a of the fixed clamp 142.

The movable clamp 208 is different from the movable clamp 166 essentially in that the movable clamp 208 does not have a presser equivalent to the presser 166b of the movable clamp 166. Such a structure of the movable clamp 208 enables the movable clamp 208 to clamp the inner side panel member 18 neatly and firmly against the outer side panel member 10 while the outer and inner side panel members 10, 18 are being welded to each other.

Figure 11:
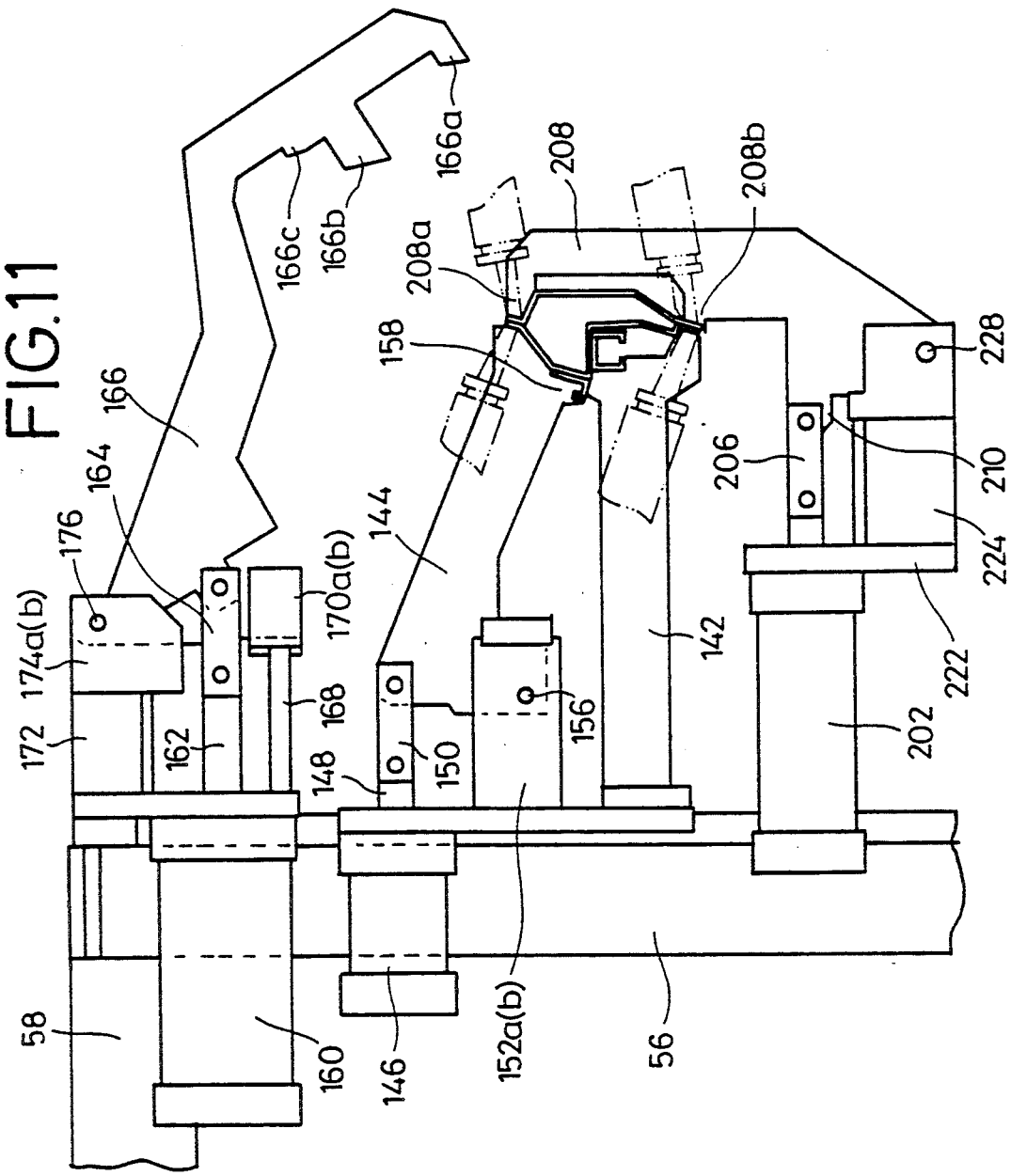
FIG. 11 is a side elevational view showing the manner in which the outer and inner side panel members are welded.

FIG. 11 shows the manner in which the outer and inner side panel members 10, 18 are clamped together in superposed relation by the movable clamps 208, 144 and the fixed clamp 142. It can clearly be seen from FIG. 11 that the lack of a presser on the movable clamp 208, which is equivalent to the presser 166b, makes it possible to hold the inner side panel member 18 securely against the outer side panel member 10.

Figure 10:
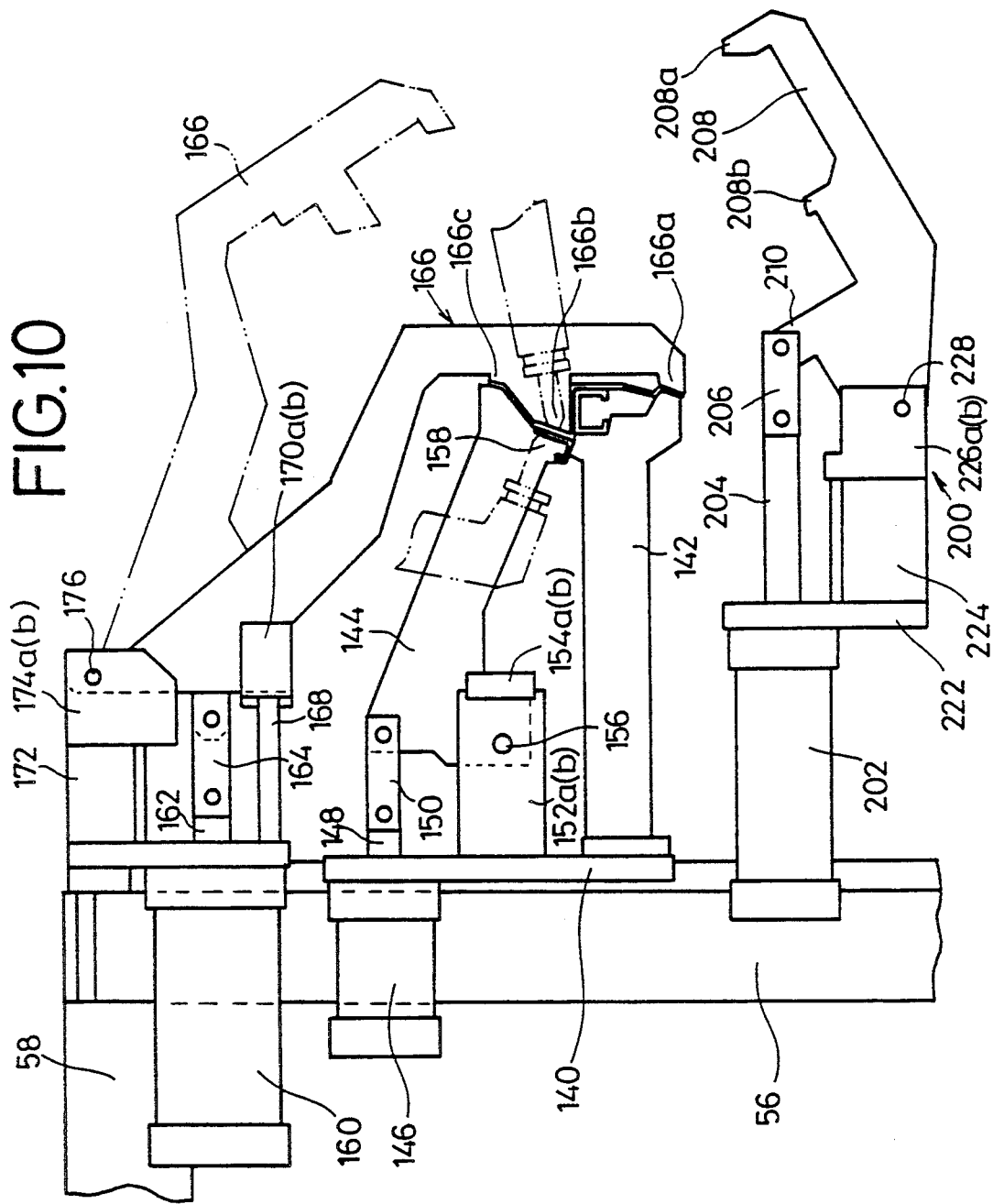
FIG. 10 is a side elevational view illustrative of the positional relationship between the clamping mechanism shown in FIG. 9 and a movable clamping mechanism which is used when the inner side panel member is welded.
Figure 12:
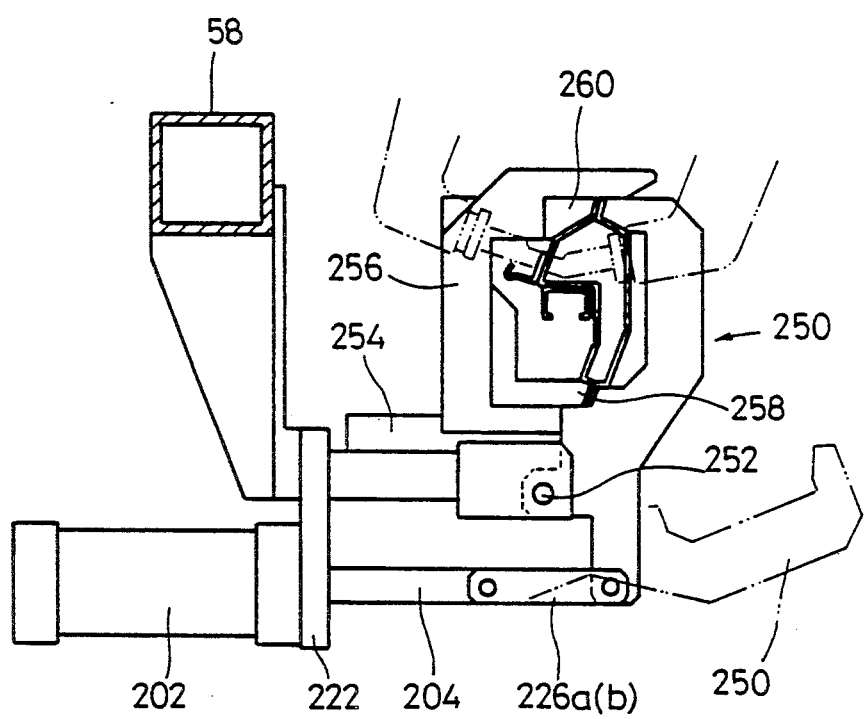
FIG. 12 is a side elevational view of a clamping mechanism according to another embodiment, the view showing the manner in which the inner side panel member is welded to the outer side pane member while the latter is being fixed by guide members.

In FIGS. 9 through 11, the fixed clamp 142 holds the outer side panel member 10 in cooperation with the movable clamps 144, 166 or the movable clamp 208, while the fixed clamp 142 is being held against one surface of the outer side panel member 10. However, it is also possible to hold the outer side panel member 10 at its ends while it is being welded. Such a modification is shown in FIG. 12. In FIG. 12, a movable clamp 250 which has a pair of spaced pressers 250a, 250b is angularly movable supported with respect to the support column 58. A support 254 is attached to the support 206, and another support 256 is fixed to the support 254. To the support 256, there are attached guide members 258, 260 for positioning the ends of the outer side panel member 10, against which the inner side pane member 18 is clamped by the movable clamp 250. The guide members 258, 260 can therefore position the ends of the outer and inner side panel members 10, 18 transversely through engagement therewith.

The clamping assemblies 70, each of the structure described above, are positioned at suitable locations on the support frame 52 which match the configuration of a final product, as indicated by the two-dot-and-dash lines in FIG. 5. The welding guns 60, 80 are movably provided in combination with the clamping assemblies 70, respectively.

The welding apparatus for welding a panel with a space defined therein is basically constructed as described above. Now, operation and advantages of the welding apparatus will be described below.

A workpiece W, which is composed of the outer and inner side panel members 10, 18, is positioned and clamped on the support frame 52 by the clamping mechanisms 130, 200 (or 250), so that a side panel for a box-shaped automobile will be competed. First, operation of the clamping mechanism 130 will be described below.

The rail 16 has already been welded to the outer side panel component 12. The drip molding 14 is now welded to the panel component 12. More specifically, the presser 142a of the fixed clamp 142 is held in contact with an end of the panel component 12, and the drip molding 14 is positioned with respect to the panel component 12 by a feed mechanism (not shown). The cylinder 146 (FIG. 9) is then actuated to extend the piston rod 148, thereby displacing the link 150 to turn the distal end of the movable clamp 144 about the shaft 156 until the presser 158 abuts against the groove of the drip molding 14 and a side of the panel component 12.

Then, the cylinder 160 is actuated to extend the piston rod 162 to cause the link 164 to turn the movable clamp 166 about the shaft 176 into the solid-line position shown in FIG. 9. The pressers 166a, 166b, 166c of the movable clamp 166 now hold the panel component 12, the drip molding 14, and the rail 16 in coaction with the pressers 142a, 142b, 158.

The welding gun 60 and the welding guns 124 of the welding robots 80 which have been brought into given positions, are then energized to weld the pane component 12 and the drip molding 14, as indicated by the two dot-and-dash lines in FIG. 9. More specifically, on each of the welding robots 80, for example, the air cylinder 128 is actuated to displace the electrode tips 126 toward each other, and a welding current supplied from the transformer 122 flows between the electrode tips 126 across the panel component 12 and the drip molding 14, which are joined to each other with the Joule heat generated by the welding current. If the arrangement shown in FIG. 12 is employed, the panel component 12 is transversely positioned by the guide members 258, 260.

After the outer side panel member 10 has been produced, the movable clamp 166 is retracted away from the outer side panel member 10 so that the inner side pane member 18 can be held against the outer side panel member 10 in superposed relation. More specifically, the cylinder 160 is operated to project the piston rod 162, thus turning the movable clamp 166 about the shaft 176 into the two-dot-and-dash-line position away from the fixed clamp 142 and the movable clamp 144. At this time, the outer side panel member 10 remains positionally stable against displacement because it is securely held by the fixed and movable clamps 258, 260 or the guide members 258, 260. Moreover, not all the movable clamps 166 mounted on the support frame 52 are simultaneously moved or opened away from the fixed and movable clamps 142, 144, but the movable clamps 166 may be successively opened. For example, the movable clamps 166 may be opened in a successive sequence from upper movable clamps to lateral movable clamps and then to lower movable clamps in FIG. 5, and the inner side panel member 18 may be brought into superposed abutment against the outer side panel member 10 successively by the movable clamps 108 with respect to the successively opened movable clamps 166. In this manner, the outer side panel member 10 is reliably prevented from being positionally displaced when the movable clamps 166 are opened.

When the movable clamp 166 is opened to move the pressers 166a, 166b, 166c away from the pressers 142a, 142b, 158, the inner side panel member 18 is brought into superposed abutment against the outer side panel member 10, and the movable clamp 208 (FIGS. 10 and 11) is actuated. More specifically, the cylinder 202 is actuated to retract the piston rod 204, causing the link 206 to pull the finger 210. The movable clamp 208 is now turned about the shaft 228 from the position shown in FIG. 10 to the position shown in FIG. 11, in which the movable clamp 108 firmly holds the inner side panel member 10 against the outer side panel member 18. Since the movable clamp 208 lacks a presser equivalent to the presser 166b of the movable clamp 166, the movable clamp 208 can neatly hold the inner side panel member 18 against the outer side panel member 10 unobstructedly. If the structure shown in FIG. 12 is employed, the pressers 250a, 250b of the movable clamp 250 press the inner side panel member 18 against the outer side panel member 10 on end surfaces of the guide members 260, 258. The welding guns 60, 124 are then energized to weld the outer and inner side panel members 10, 18.

After the outer and inner side panel members 10, 18 are fully welded together, the movable clamp 208 or 250 is opened by the cylinder 202, and then the movable clamp 144 is angularly moved out of the groove of the drip molding 14 by the cylinder 146. The completed side panel can now be removed from the welding apparatus, and delivered to a next process.

With the present invention, as described above, when a panel with a space defined therein, such as an automobile side panel, is to be welded into a unitary structure, the drip molding 14 is first welded to the panel component 12 in a welding station, thereby producing the outer side panel member 10 as a first panel member, and then the inner side panel member 18 as a second panel member is welded to the outer side panel member 10 in the same welding station. While the panel members are being thus welded, they are securely held in position to allow themselves to be welded accurately. Even if there is a space defined between the panel members, these panel members are prevented from being positionally displaced during the welding process. Since the panel members are not required to be transferred from one welding station to another, the welding efficiency is high. The welding apparatus can be installed in a small installation factory space since it has no device for transferring the panel members from one welding station to another.

After the drip molding 14 has been welded to the panel component 12, at least the fixed clamp 142 continuously holds the first panel member or the outer side panel member in the same position. Consequently, the first panel member does not need to be positioned again. As the clamps 142, 144 are shared or continuously used when the drip molding 14 is welded to the panel component 12 and when the outer and inner side panel members 10, 18 are welded, the welding apparatus is of a lower cost and a smaller size.

Although certain preferred embodiments have been shown and described, it should be understood that many changes and modifications may be made therein without departing from the scope of the appended claims.

What is claimed is:

1. A method of welding a panel with a space defined therein, comprising the steps of:
    a) positioning a plurality of first panel components with a plurality of first clamping mechanisms, each of said first clamping mechanisms comprising a plurality of first clamping members capable of releasably engaging said first panel components;
    b) welding the positioned first panel components into a first panel member in one welding station;
    c) opening at least one of said plurality of first clamping members with the first panel member remaining positioned by other of said first clamping members and positioning a second panel member in superposed relation to said first panel member with a plurality of second clamping mechanisms, each of said second clamping mechanisms comprising a second clamping member, said first and second panel members being maintained in position by said second clamping member and the remaining first clamping members; and
    d) welding the positioned first and second panel members into a panel in said one welding station.

2. A method according to claim 1, wherein said positioning step c) comprises the steps of:
    successively operating said first clamping mechanisms to release said first panel member; and
    then bringing the second panel member into superposed relation to said first panel member with respect to the successively released first clamping mechanisms.

3. A method according to claim 1 or 2, wherein said first panel member comprises an automobile outer side panel member and said second panel member comprises an automobile inner side panel member.

4. An apparatus for welding a panel with a space defined therein, comprising:
    a plurality of first clamping mechanisms for positioning a plurality of first panel components, each of said first clamping mechanisms comprising a plurality of first clamping members capable of releasably engaging said first panel components;
    a plurality of first welding guns for welding the positioned first panel components into a first panel member;
    a plurality of second clamping mechanisms for positioning a second panel member in superposed relation to said first panel member, each of said second clamping mechanism comprising a second clamping member, wherein said first and second panel members are held in position by said second clamping member and selected ones of said first clamping members; and
    a plurality of second welding guns for welding the positioned first and second panel members;
    wherein said first clamping mechanisms, said second clamping mechanisms, said first welding guns, and said second welding guns are disposed in a single welding station.

5. An apparatus according to claim 4, wherein said plurality of first clamping members comprises a fixed clamp and a first movable clamp for receiving the first panel member and a second movable clamp for pressing the first panel member against said first movable clamp and said fixed clamp.

6. An apparatus according to claim 5, wherein said second clamping member is positioned for coaction with said fixed clamp and said first movable clamp, said second clamping member comprising a movable clamp for positioning the second panel member in coaction with said fixed clamp and said first movable clamp while said second movable clamp is retracted away from said fixed clamp and said first movable clamp.

7. An apparatus according to claim 6, wherein said second movable clamp of said each first clamping mechanism comprises a pair of pressers and an intermediate presser positioned therebetween, and said movable clamp of said each second clamping mechanism is essentially identical in shape to said second movable clamp except that said movable clamp is devoid of said intermediate presser.

8. An apparatus according to any one of claims 4 through 6, wherein said each second clamping mechanism has a guide member for positioning an end of the first panel member.

9. An apparatus according to any one of claims 4 through 7, wherein a space is defined between said first and second panel members which are welded to each other.

10. An apparatus according to any one of claims 4 through 7, wherein said first panel member comprises an automobile outer side panel member and said second panel member comprises an automobile inner side panel member.

* * * * *